(12) United States Patent
Lee et al.

(10) Patent No.: US 11,698,512 B2
(45) Date of Patent: Jul. 11, 2023

(54) WIDE-ANGLE LENS ASSEMBLY

(71) Applicants: Sintai Optical (Shenzhen) Co., Ltd., ShenZhen (CN); Asia Optical Co., Inc., Taichung (TW)

(72) Inventors: Jian-Wei Lee, Taichung (TW); Shu-Hung Lin, Taichung (TW)

(73) Assignees: SINTAI OPTICAL (SHENZHEN) CO., LTD., Shenzhen (TW); ASIA OPTICAL CO., INC., Taichung (TW)

(*) Notice: Subject to any disclaimer, the term of this patent is extended or adjusted under 35 U.S.C. 154(b) by 420 days.

(21) Appl. No.: 17/093,912

(22) Filed: Nov. 10, 2020

(65) Prior Publication Data

US 2021/0181466 A1    Jun. 17, 2021

(30) Foreign Application Priority Data

Dec. 11, 2019 (CN) .......................... 201911262385.8

(51) Int. Cl.
*G02B 9/64* (2006.01)
*G02B 13/06* (2006.01)
*G02B 13/00* (2006.01)

(52) U.S. Cl.
CPC ............ *G02B 9/64* (2013.01); *G02B 13/006* (2013.01); *G02B 13/06* (2013.01); *G02B 13/0045* (2013.01)

(58) Field of Classification Search
CPC ........ G02B 9/64; G02B 13/06; G02B 13/006; G02B 13/0045
See application file for complete search history.

(56) References Cited

U.S. PATENT DOCUMENTS

2013/0329305 A1   12/2013   Kunugise
2019/0273848 A1*  9/2019   Satoh ................. G02B 13/0045

FOREIGN PATENT DOCUMENTS

| CN | 105652414 A | 6/2016 | |
|---|---|---|---|
| CN | 208092313 U | 11/2018 | |
| CN | 110376719 A | 10/2019 | |
| CN | 110376725 B * | 3/2021 | ........... G02B 13/005 |
| EP | 1571479 A2 | 9/2005 | |
| JP | 201854910 A | 4/2018 | |
| JP | 2018054910 A * | 4/2018 | ............. G02B 13/00 |
| JP | 2018205658 A | 12/2018 | |

(Continued)

*Primary Examiner* — Kristina M Deherrera
*Assistant Examiner* — Anna Elizabeth Smith
(74) *Attorney, Agent, or Firm* — McClure, Qualey & Rodack, LLP

(57) ABSTRACT

A wide-angle lens assembly includes a first, second, third, fourth, fifth, sixth, seventh, eighth, ninth, and tenth lenses. The first and second lenses are meniscus lenses with negative refractive power. The third and ninth lenses are with negative refractive power. The fourth lens is with refractive power and includes a concave surface facing an object side. The fifth, sixth, and eighth lenses are with positive refractive power. The seventh lens is with refractive power and includes a concave surface facing the object side. The tenth lens is with refractive power and includes a concave surface facing an image side. The wide-angle lens assembly satisfies: $6<f_5/f<8.5$; wherein $f_5$ is an effective focal length in mm of the fifth lens and f is an effective focal length in mm of the wide-angle lens assembly.

18 Claims, 15 Drawing Sheets

(56) References Cited

FOREIGN PATENT DOCUMENTS

| | | | | |
|---|---|---|---|---|
| TW | 676835 | B1 | * | 11/2019 |
| TW | 202013000 | A | * | 4/2020 |
| TW | I676835 | B | | 4/2020 |

* cited by examiner

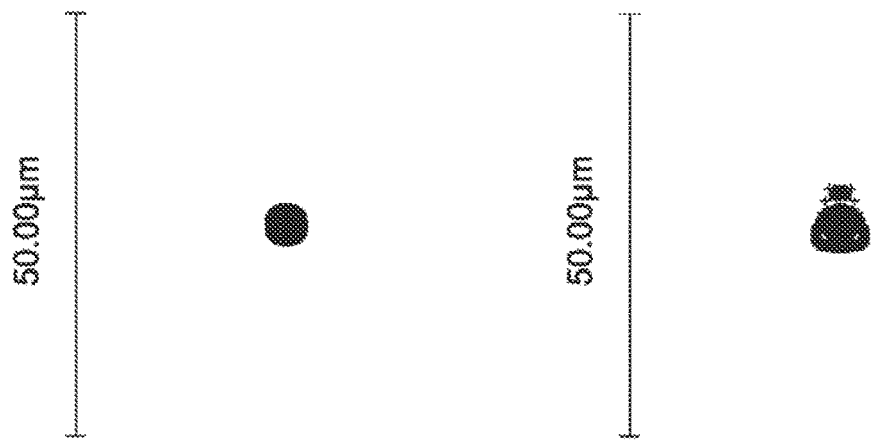
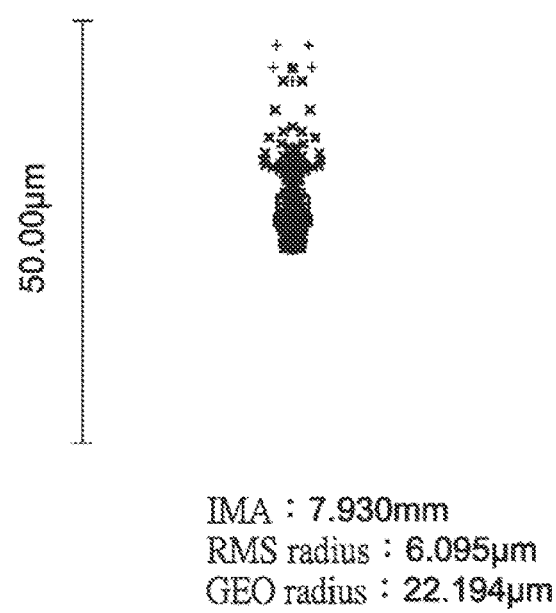
Fig. 2C
IMA: 0.000mm
RMS radius: 0.861μm
GEO radius: 1.892μm
Fig. 2D
IMA: 3.965mm
RMS radius: 1.460μm
GEO radius: 4.518μm
Fig. 2E
IMA: 7.930mm
RMS radius: 6.095μm
GEO radius: 22.194μm

| + 0.4550μm | ⋈ 0.6140μm |
| × 0.5020μm | ⋈ 0.6610μm |
| ▫ 0.5580μm | Spot Diagram |

IMA : 0.000mm
RMS radius : 0.747μm
GEO radius : 1.592μm

IMA : 3.965mm
RMS radius : 1.414μm
GEO radius : 3.569μm

IMA : 7.930mm
RMS radius : 3.428μm
GEO radius : 13.198μm

| | | | |
|---|---|---|---|
| + | 0.4550μm | ⊠ | 0.6140μm |
| × | 0.5020μm | ⋈ | 0.6610μm |
| ◻ | 0.5580μm | | Spot Diagram |

IMA : 0.000mm
RMS radius : 1.144μm
GEO radius : 2.570μm

IMA : 3.965mm
RMS radius : 1.396μm
GEO radius : 3.661μm

IMA : 7.930mm
RMS radius : 5.516μm
GEO radius : 19.388μm

WIDE-ANGLE LENS ASSEMBLY

BACKGROUND OF THE INVENTION

Field of the Invention

The invention relates to a wide-angle lens assembly.

Description of the Related Art

The current development trend of a wide-angle lens assembly is toward large field of view. Additionally, the wide-angle lens assembly is developed to have high resolution and resistance to environmental temperature change in accordance with different application requirements. However, the known wide-angle lens assembly can't satisfy such requirements. Therefore, the wide-angle lens assembly needs a new structure in order to meet the requirements of large field of view, high resolution, and resistance to environmental temperature change at the same time.

BRIEF SUMMARY OF THE INVENTION

The invention provides a wide-angle lens assembly to solve the above problems. The wide-angle lens assembly of the invention is provided with characteristics of an increased field of view, an increased resolution, a resisted environmental temperature change, and still has a good optical performance.

The wide-angle lens assembly in accordance with an exemplary embodiment of the invention includes a first lens, a second lens, a third lens, a fourth lens, a fifth lens, a sixth lens, a seventh lens, an eighth lens, a ninth lens, and a tenth lens, all of which are arranged in order from an object side to an image side along an optical axis. The first lens is a meniscus lens with negative refractive power. The second lens is a meniscus lens with negative refractive power. The third lens is with negative refractive power. The fourth lens is with refractive power and includes a concave surface facing the object side. The fifth lens is with positive refractive power. The sixth lens is with positive refractive power. The seventh lens is with refractive power and includes a concave surface facing the object side. The eighth lens is with positive refractive power. The ninth lens is with negative refractive power. The tenth lens is with refractive power and includes a concave surface facing the image side. The wide-angle lens assembly satisfies: $6<f_5/f<8.5$; wherein $f_5$ is an effective focal length in mm of the fifth lens and f is an effective focal length in mm of the wide-angle lens assembly.

In another exemplary embodiment, the first lens includes a convex surface facing the object side and a concave surface facing the image side, the second lens includes a convex surface facing the object side and a concave surface facing the image side, the third lens includes a concave surface facing the object side and a convex surface facing the image side, the fourth lens is with positive refractive power and further includes a convex surface facing the image side, the fifth lens includes a convex surface facing the object side and another convex surface facing the image side, the sixth lens includes a convex surface facing the object side and another convex surface facing the image side, the seventh lens is with positive refractive power and further includes a convex surface facing the image side, the eighth lens includes a convex surface facing the object side and another convex surface facing the image side, the ninth lens includes a concave surface facing the object side and a convex surface or a plane surface facing the image side, and the tenth lens is with positive refractive power and further includes a convex surface facing the object side.

In yet another exemplary embodiment, the third lens and the fourth lens are cemented and the eighth lens and the ninth lens are cemented.

In another exemplary embodiment, the wide-angle lens assembly satisfies at least one of the following conditions: $0.7<TTL/\theta<0.82$; $11<TTL/f<14$; $12.03<TTL/f<12.93$; $0.74<TTL/\theta<0.79$; $6.31<f_5/f<7.98$; wherein TTL is an interval in mm from an object side surface of the first lens to an image plane along the optical axis, $\theta$ is a half field of view in degree for the wide-angle lens assembly, $f_5$ is the effective focal length in mm of the fifth lens, and f is the effective focal length in mm of the wide-angle lens assembly.

The wide-angle lens assembly in accordance with another exemplary embodiment of the invention includes a first lens, a second lens, a third lens, a fourth lens, a fifth lens, a sixth lens, a seventh lens, an eighth lens, a ninth lens, and a tenth lens, all of which are arranged in order from an object side to an image side along an optical axis. The first lens is a meniscus lens with negative refractive power. The second lens is a meniscus lens with negative refractive power. The third lens is with refractive power. The fourth lens is with refractive power. The fifth lens is with positive refractive power. The sixth lens is with positive refractive power. The seventh lens is with refractive power and includes a concave surface facing the object side. The eighth lens is with refractive power. The ninth lens is with refractive power. The tenth lens is with refractive power and includes a concave surface facing the image side. The wide-angle lens assembly satisfies: $0.7<TTL/\theta<0.82$; wherein TTL is an interval in mm from an object side surface of the first lens to an image plane along the optical axis and $\theta$ is a half field of view in degree for the wide-angle lens assembly.

In another exemplary embodiment, the third lens is with negative refractive power, the fourth lens is with positive refractive power and includes a concave surface facing the object side and a convex surface facing the image side, the seventh lens is with positive refractive power and further includes a convex surface facing the image side, the eighth lens which is with positive refractive power, the ninth lens which is with negative refractive power, the tenth lens is with positive refractive power and further includes a convex surface facing the object side.

In yet another exemplary embodiment, the first lens includes a convex surface facing the object side and a concave surface facing the image side, the second lens includes a convex surface facing the object side and a concave surface facing the image side, the third lens includes a concave surface facing the object side and a convex surface facing the image side, the fifth lens includes a convex surface facing the object side and another convex surface facing the image side, the sixth lens includes a convex surface facing the object side and another convex surface facing the image side, the eighth lens includes a convex surface facing the object side and another convex surface facing the image side, the ninth lens includes a concave surface facing the object side.

In another exemplary embodiment, the ninth lens includes a convex surface or a plane surface facing the image side.

In yet another exemplary embodiment, the third lens and the fourth lens are cemented to form a lens with negative refractive power.

In another exemplary embodiment, the eighth lens and the ninth lens are cemented to form a lens with negative refractive power.

In yet another exemplary embodiment, the wide-angle lens assembly satisfies at least one of the following conditions: $11<TTL/f<14$; $6<f_5/f<8.5$; wherein TTL is the interval in mm from the object side surface of the first lens to the image plane along the optical axis, $f_5$ is an effective focal length in mm of the fifth lens, and f is an effective focal length in mm of the wide-angle lens assembly.

In another exemplary embodiment, the wide-angle lens assembly satisfies at least one of the following conditions: $12.03<TTL/f<12.93$; $0.74<TTL/\theta<0.79$; $6.31<f_5/f<7.98$; wherein TTL is the interval in mm from the object side surface of the first lens to the image plane along the optical axis, $\theta$ is the half field of view in degree for the wide-angle lens assembly, $f_5$ is the effective focal length in mm of the fifth lens, and f is the effective focal length in mm of the wide-angle lens assembly.

The wide-angle lens assembly in accordance with yet another exemplary embodiment of the invention includes a first lens, a second lens, a third lens, a fourth lens, a fifth lens, a sixth lens, a seventh lens, an eighth lens, a ninth lens, and a tenth lens, all of which are arranged in order from an object side to an image side along an optical axis. The first lens is a meniscus lens with negative refractive power. The second lens is a meniscus lens with negative refractive power. The third lens is with refractive power. The fourth lens is with refractive power. The fifth lens is with positive refractive power. The sixth lens is with positive refractive power. The seventh lens is with refractive power and includes a concave surface facing the object side. The eighth lens is with refractive power. The ninth lens is with refractive power. The tenth lens is with refractive power and includes a concave surface facing the image side. The wide-angle lens assembly satisfies: $11<TTL/f<14$; wherein TTL is an interval in mm from an object side surface of the first lens to an image plane along the optical axis and f is an effective focal length in mm of the wide-angle lens assembly.

In another exemplary embodiment, the fourth lens is with positive refractive power and includes a convex surface facing the image side, the seventh lens is with positive refractive power and further includes a convex surface facing the image side, the tenth lens is with positive refractive power and further includes a convex surface facing the object side.

In yet another exemplary embodiment, the first lens includes a convex surface facing the object side and a concave surface facing the image side, the second lens includes a convex surface facing the object side and a concave surface facing the image side, the third lens includes a concave surface facing the object side and a convex surface facing the image side, the fifth lens includes a convex surface facing the object side and another convex surface facing the image side, the sixth lens includes a convex surface facing the object side and another convex surface facing the image side, the eighth lens includes a convex surface facing the object side and another convex surface facing the image side, the ninth lens includes a concave surface facing the object side.

In another exemplary embodiment, the ninth lens includes a convex surface or a plane surface facing the image side.

In yet another exemplary embodiment, the third lens is with negative refractive power, the fourth lens includes a concave surface facing the object side, the eighth lens which is with positive refractive power, the ninth lens which is with negative refractive power.

In another exemplary embodiment, the wide-angle lens assembly satisfies at least one of the following conditions:

$6<f_5/f<8.5$; $0.7<TTL/\theta<0.82$; wherein TTL is the interval in mm from the object side surface of the first lens to the image plane along the optical axis, $\theta$ is a half field of view in degree for the wide-angle lens assembly, $f_5$ is an effective focal length in mm of the fifth lens, and f is the effective focal length in mm of the wide-angle lens assembly.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIGS. 2C-2E are spot diagrams of the wide-angle lens assembly in accordance with the first embodiment of the invention;

DETAILED DESCRIPTION OF THE INVENTION

Figure 1:
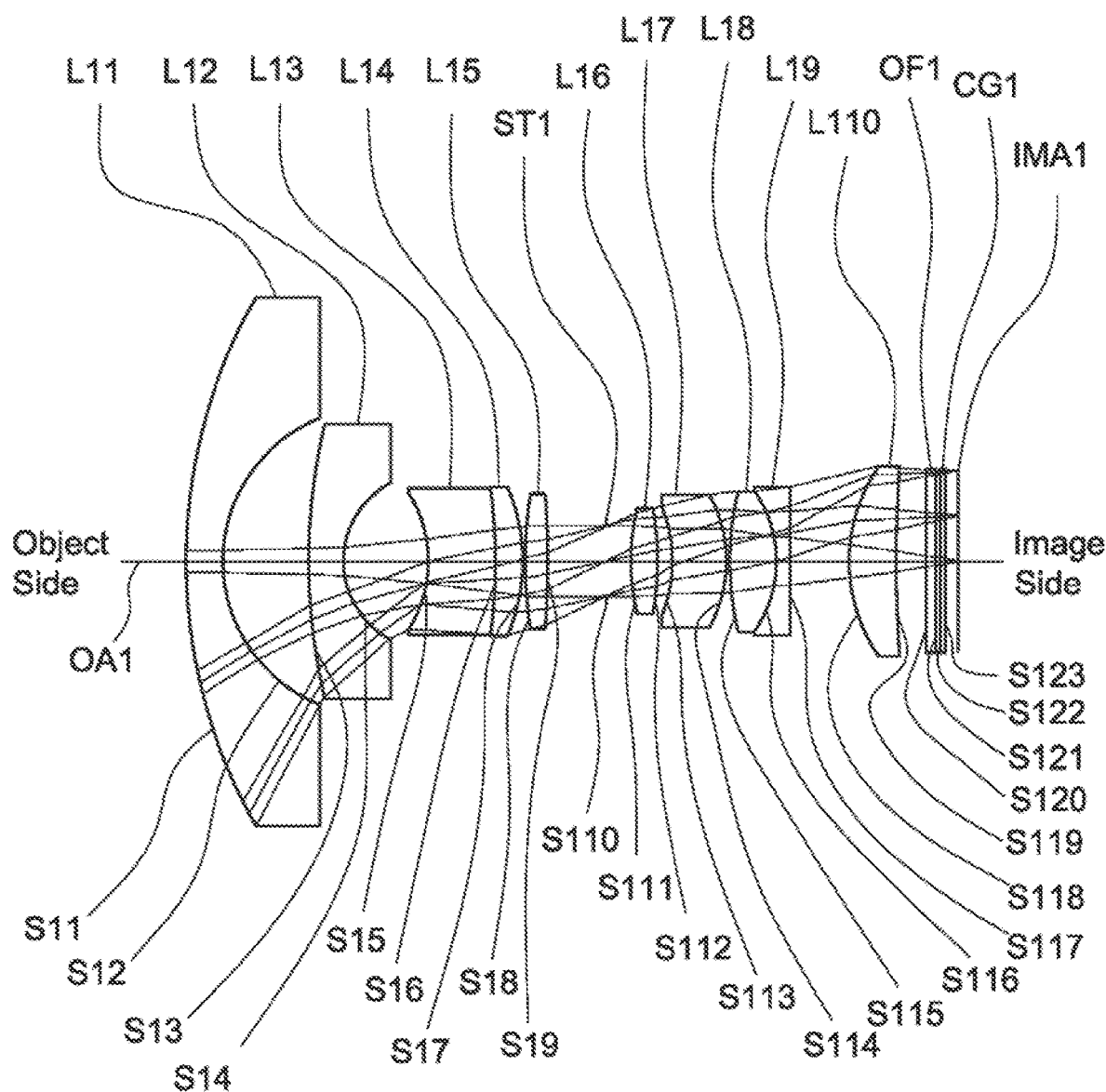
FIG. 1 is a lens layout and optical path diagram of a wide-angle lens assembly in accordance with a first embodiment of the invention.

The following description is made for the purpose of illustrating the general principles of the invention and should not be taken in a limiting sense. The scope of the invention is best determined by reference to the appended claims.

The present invention provides a wide-angle lens assembly including a first lens, a second lens, a third lens, a fourth lens, a fifth lens, a sixth lens, a seventh lens, an eighth lens, a ninth lens, and a tenth lens. The first lens is a meniscus lens with negative refractive power. The second lens is a meniscus lens with negative refractive power. The third lens is with negative refractive power. The fourth lens is with refractive power and includes a concave surface facing an object side. The fifth lens is with positive refractive power. The sixth lens is with positive refractive power. The seventh lens is with refractive power and includes a concave surface facing the object side. The eighth lens is with positive refractive power. The ninth lens is with negative refractive power. The tenth lens is with refractive power and includes a concave surface an image side. The first lens, the second lens, the third lens, the fourth lens, the fifth lens, the sixth lens, the seventh lens, the eighth lens, the ninth lens, and the tenth lens are arranged in order from the object side to the image side along an optical axis. The wide-angle lens assembly satisfies: $6<f_5/f<8.5$; wherein $f_5$ is an effective focal length of the fifth lens and f is an effective focal length of the wide-angle lens assembly.

The present invention provides another wide-angle lens assembly including a first lens, a second lens, a third lens, a fourth lens, a fifth lens, a sixth lens, a seventh lens, an eighth lens, a ninth lens, and a tenth lens. The first lens is a meniscus lens with negative refractive power. The second lens is a meniscus lens with negative refractive power. The third lens is with refractive power. The fourth lens is with refractive power. The fifth lens is with positive refractive power. The sixth lens is with positive refractive power. The seventh lens is with refractive power and includes a concave surface facing an object side. The eighth lens is with refractive power. The ninth lens is with refractive power. The tenth lens is with refractive power and includes a concave surface an image side. The first lens, the second lens, the third lens, the fourth lens, the fifth lens, the sixth lens, the seventh lens, the eighth lens, the ninth lens, and the tenth lens are arranged in order from the object side to the image side along an optical axis. The wide-angle lens assembly satisfies: $0.7<TTL/\theta<0.82$; wherein TTL is an interval in mm from an object side surface of the first lens to an image plane along the optical axis and θ is a half field of view in degree for the wide-angle lens assembly.

The present invention provides yet another wide-angle lens assembly including a first lens, a second lens, a third lens, a fourth lens, a fifth lens, a sixth lens, a seventh lens, an eighth lens, a ninth lens, and a tenth lens. The first lens is a meniscus lens with negative refractive power. The second lens is a meniscus lens with negative refractive power. The third lens is with refractive power. The fourth lens is with refractive power. The fifth lens is with positive refractive power. The sixth lens is with positive refractive power. The seventh lens is with refractive power and includes a concave surface facing an object side. The eighth lens is with refractive power. The ninth lens is with refractive power. The third lens and the fourth lens are cemented. The eighth lens and the ninth lens are cemented. The tenth lens is with refractive power and includes a concave surface an image side. The first lens, the second lens, the third lens, the fourth lens, the fifth lens, the sixth lens, the seventh lens, the eighth lens, the ninth lens, and the tenth lens are arranged in order from the object side to the image side along an optical axis. The wide-angle lens assembly satisfies: $11<TTL/f<14$; wherein TTL is an interval in mm from an object side surface of the first lens to an image plane along the optical axis and f is an effective focal length in mm of the wide-angle lens assembly.

Referring to Table 1, Table 2, Table 4, Table 5, Table 7, and Table 8, wherein Table 1, Table 4, and Table 7 show optical specification in accordance with a first, second, and third embodiments of the invention respectively and Table 2, Table 5, and Table 8 show aspheric coefficient of each aspheric lens in Table 1, Table 4, and Table 7 respectively.

Figure 3:
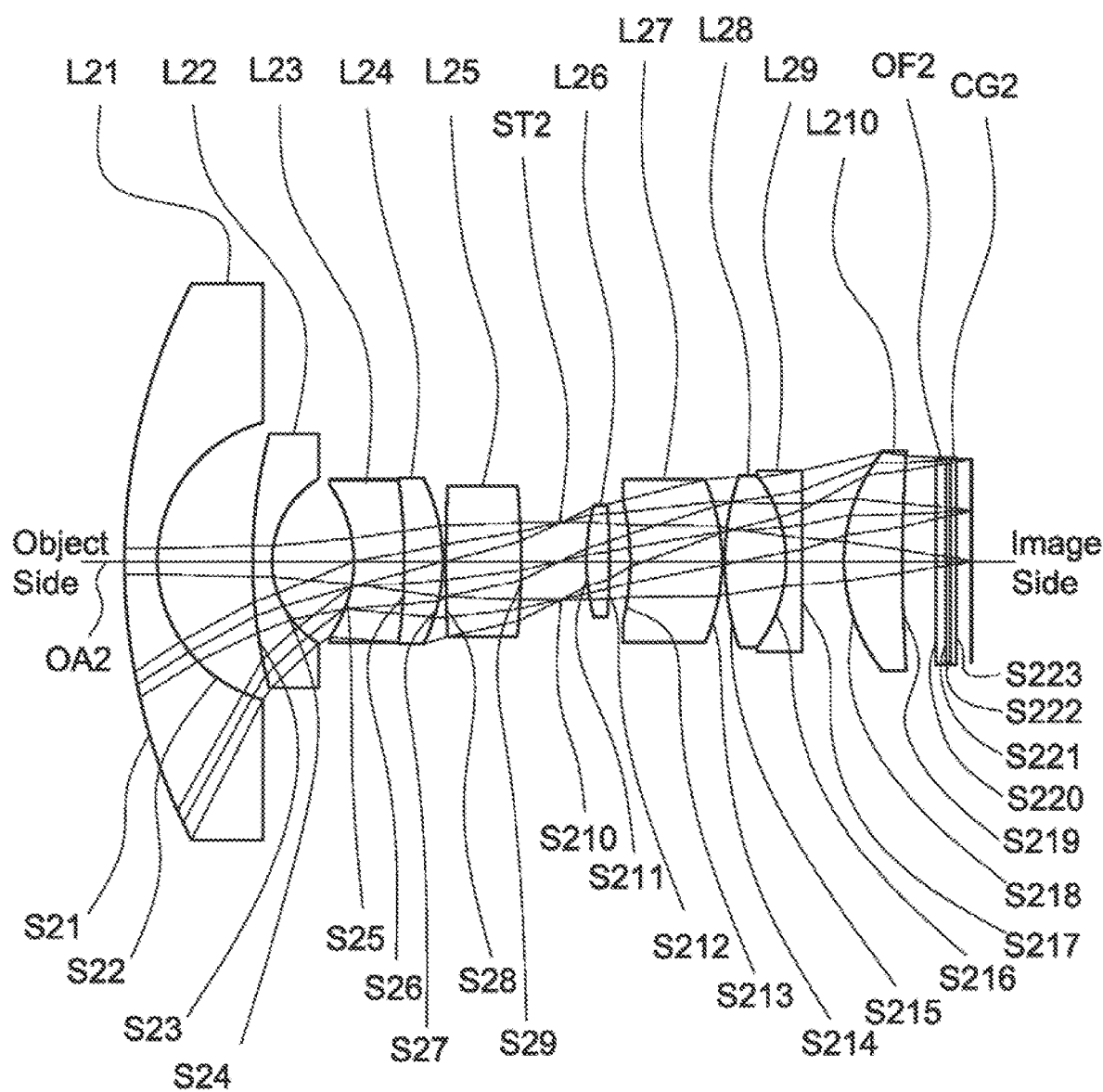
FIG. 3 is a lens layout and optical path diagram of a wide-angle lens assembly in accordance with a second embodiment of the invention.
Figure 5:
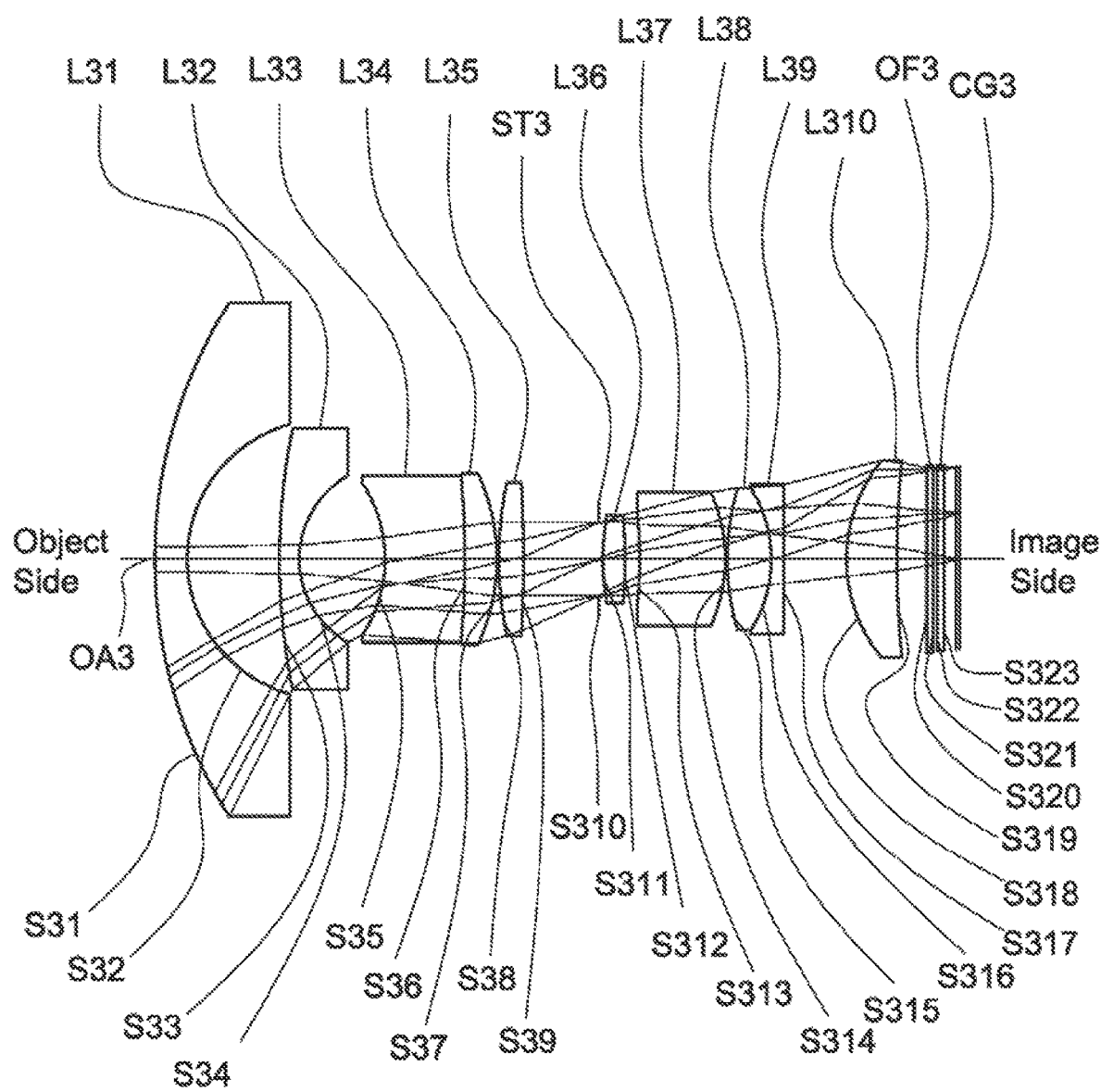
FIG. 5 is a lens layout and optical path diagram of a wide-angle lens assembly in accordance with a third embodiment of the invention.

FIG. 1, FIG. 3, and FIG. 5 are lens layout and optical path diagrams of the wide-angle lens assembly in accordance with the first, second, and third embodiments of the invention respectively.

The first lens L11, L21, L31 are meniscus lenses with negative refractive power and made of glass material, wherein the object side surfaces S11, S21, S31 are convex surfaces, the image side surfaces S12, S22, S32 are concave surfaces, and the object side surfaces S11, S21, S31 and the image side surfaces S12, S22, S32 are spherical surfaces.

The second lens L12, L22, L32 are meniscus lenses with negative refractive power and made of glass material, wherein the object side surfaces S13, S23, S33 are convex surfaces, the image side surfaces S14, S24, S34 are concave surfaces, and the object side surfaces S13, S23, S33 and the image side surfaces S14, S24, S34 are spherical surfaces.

The third lens L13, L23, L33 are meniscus lenses with negative refractive power and made of glass material, wherein the object side surfaces S15, S25, S35 are concave surfaces, the image side surfaces S16, S26, S36 are convex surfaces, and the object side surfaces S15, S25, S35 and the image side surfaces S16, S26, S36 are spherical surfaces.

The fourth lens L14, L24, L34 are meniscus lenses with positive refractive power and made of glass material, wherein the object side surfaces S16, S26, S36 are concave surfaces, the image side surfaces S17, S27, S37 are convex surfaces, and the object side surfaces S16, S26, S36 and the image side surfaces S17, S27, S37 are spherical surfaces.

The fifth lens L15, L25, L35 are biconvex lenses with positive refractive power and made of glass material, wherein the object side surfaces S18, S28, S38 are convex surfaces, the image side surfaces S19, S29, S39 are convex surfaces, and the object side surfaces S18, S28, S38 and the image side surfaces S19, S29, S39 are spherical surfaces.

The sixth lens L16, L26, L36 are biconvex lenses with positive refractive power and made of glass material, wherein the object side surfaces S111, S211, S311 are convex surfaces, the image side surfaces S112, S212, S312 are convex surfaces, and the object side surfaces S111, S211, S311 and the image side surfaces S112, S212, S312 are spherical surfaces.

The seventh lens L17, L27, L37 are meniscus lenses with positive refractive power and made of glass material, wherein the object side surfaces S113, S213, S313 are concave surfaces, the image side surfaces S114, S214, S314 are convex surfaces, and the object side surfaces S113, S213, S313 and the image side surfaces S114, S214, S314 are spherical surfaces.

The eighth lens L18, L28, L38 are biconvex lenses with positive refractive power and made of glass material, wherein the object side surfaces S115, S215, S315 are convex surfaces, the image side surfaces S116, S216, S316 are convex surfaces, and the object side surfaces S115, S215, S315 and the image side surfaces S116, S216, S316 are spherical surfaces.

The ninth lens L19, L29, L39 are with negative refractive power and made of glass material, wherein the object side surfaces S116, S216, S316 are concave surfaces and the object side surfaces S116, S216, S316 are spherical surfaces.

The tenth lens L110, L210, L310 are meniscus lenses with positive refractive power and made of glass material, wherein the object side surfaces S118, S218, S318 are convex surfaces, the image side surfaces S119, S219, S319 are concave surfaces, and the object side surfaces S118, S218, S318 and the image side surfaces S119, S219, S319 are aspheric surfaces.

The third lenses L13, L23, L33 and the fourth lenses L14, L24, L34 are cemented to form a lens with negative refractive power respectively.

The eighth lenses L18, L28, L38 and the ninth lenses L19, L29, L39 are cemented to form a lens with negative refractive power respectively.

In addition, the wide-angle lens assembly 1, 2, 3 satisfy at least one of the following conditions:

$$11 < TTL/f < 14; \quad (1)$$

$$0.7 < TTL/\theta < 0.82; \quad (2)$$

$$6 < f_5/f < 8.5; \quad (3)$$

$$12.03 < TTL/f < 12.93; \quad (4)$$

$$0.74 < TTL/\theta < 0.79; \quad (5)$$

$$6.31 < f_5/f < 7.98; \quad (6)$$

wherein f is an effective focal length of the wide-angle lens assemblies 1, 2, 3 for the first to third embodiments, $f_5$ is an effective focal length of the fifth lenses L15, L25, L35 for the first to third embodiments, TTL is an interval in mm from the object side surfaces S11, S21, S31 of the first lenses L11, L21, L31 to the image planes IMA1, IMA2, IMA3 along the optical axes OA1, OA2, OA3 respectively for the first to third embodiments, and θ is a half field of view in degree of the wide-angle lens assemblies 1, 2, 3 for the first to third embodiments. With the wide-angle lens assemblies 1, 2, 3 satisfying at least one of the above conditions (1)-(6), the field of view can be effectively increased, the resolution can be effectively increased, the environmental temperature change can be effectively resisted, the aberration can be effectively corrected, and the chromatic aberration can be effectively corrected.

The best condition of miniaturization for the wide-angle lens assemblies 1, 2, and 3 is as the condition (1): $11 < TTL/f < 14$ is satisfied.

A detailed description of a wide-angle lens assembly in accordance with a first embodiment of the invention is as follows. Referring to FIG. 1, the wide-angle lens assembly 1 includes a first lens L11, a second lens L12, a third lens L13, a fourth lens L14, a fifth lens L15, a stop ST1, a sixth lens L16, a seventh lens L17, an eighth lens L18, a ninth lens L19, a tenth lens L110, an optical filter OF1, and a cover glass CG1, all of which are arranged in order from an object side to an image side along an optical axis OA1. In operation, an image of light rays from the object side is formed at an image plane IMA1.

According to, subject matter previously described herein, wherein: the ninth lens L19 is a plane-concave lens, wherein the image side surface S17 is a plane surface; both of the object side surface S120 and image side surface S121 of the optical filter OF1 are plane surfaces; and both of the object side surface S122 and image side surface S23 of the cover glass CG1 are plane surfaces.

With the above design of the lenses and stop ST1 and at least any one of the conditions (1)-(6) satisfied, the wide-angle lens assembly 1 can have an effective increased field of view, an effective increased resolution, an effective resisted environmental temperature change, an effective corrected aberration, and is capable of an effective corrected chromatic aberration.

Table 1 shows the optical specification of the wide-angle lens assembly 1 in FIG. 1.

TABLE 1

| Effective Focal Length = 5.47 mm | F-number = 2.8 |
| Total Lens Length = 67.96 mm | Field of View = 178.2 degrees |
| Effective Focal Length of A Combination of The Third Lens and The Fourth Lens = −128.29 mm | |
| Effective Focal Length of A Combination of The Eighth Lens and The Ninth Lens = −107.7 mm | |

| Surface Number | Radius of Curvature (mm) | Thickness (mm) | Nd | Vd | Effective Focal Length (mm) | Remark |
| --- | --- | --- | --- | --- | --- | --- |
| S11 | 46.78 | 3.23 | 1.5935 | 67.3266 | −33.14 | The First Lens L11 |
| S12 | 13.51 | 7.63 | | | | |
| S13 | 57.79 | 3.08 | 1.5168 | 64.2124 | −18.16 | The Second Lens L12 |
| S14 | 7.95 | 7.37 | | | | |
| S15 | −11.37 | 5.82 | 1.8467 | 23.7848 | −17.51 | The Third Lens L13 |
| S16 | −58.97 | 2.45 | 1.8042 | 46.5025 | 27.18 | The Fourth Lens L14 |
| S17 | −16.28 | 0.21 | | | | |
| S18 | 47.28 | 1.99 | 1.8467 | 23.7848 | 34.54 | The Fifth Lens L15 |
| S19 | −76.54 | 5.20 | | | | |
| S110 | ∞ | 2.14 | | | | Stop ST1 |
| S111 | 20.02 | 2.31 | 1.497 | 81.6084 | 22.27 | The Sixth Lens L16 |
| S112 | −23.92 | 1.26 | | | | |
| S113 | −12.48 | 4.83 | 1.497 | 81.6084 | 137.07 | The Seventh Lens L17 |
| S114 | −11.91 | 0.23 | | | | |
| S115 | 23.99 | 4.13 | 1.497 | 81.6084 | 15.88 | The Eighth Lens L18 |

TABLE 1-continued

| | | | | | | |
|---|---|---|---|---|---|---|
| S116 | −11.12 | 1.14 | 1.8467 | 23.7848 | −13.05 | The Ninth Lens L19 |
| S117 | ∞ | 5.21 | | | | |
| S118 | 11.83 | 4.23 | 1.5163 | 64.0485 | 29.83 | The Tenth Lens L110 |
| S119 | 44.33 | 2.60 | | | | |
| S120 | ∞ | 0.84 | 1.5168 | 64.1673 | | Optical Filter OF1 |
| S121 | ∞ | 0.30 | | | | |
| S122 | ∞ | 0.50 | 1.5168 | 64.1673 | | Cover Glass CG1 |
| S123 | ∞ | 1.27 | | | | |

The aspheric surface sag z of each aspheric lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F, and G are aspheric coefficients.

In the first embodiment, the conic constant k and the aspheric coefficients A, B, C, D, E, F, G of each aspheric surface are shown in Table 2.

TABLE 2

| Surface Number | k | A<br>E | B<br>F | C<br>G | D |
|---|---|---|---|---|---|
| S118 | 0.653887 | −0.00025480529<br>−1.0205332e−011 | 4.6062791e−006<br>0 | −1.5533633e−007<br>0 | 1.8626694e−009 |
| S119 | 26.11172 | −0.0003478338<br>−1.6955825e−010 | 1.3563294e−005<br>1.5315513e−012 | −5.088771e−007<br>−6.272345e−015 | 1.1451564e−008 |

Table 3 shows the parameters and condition values for conditions (1)-(6) in accordance with the first embodiment of the invention. It can be seen from Table 3 that the wide-angle lens assembly 1 of the first embodiment satisfies the conditions (1)-(6).

TABLE 3

| θ | 89.08 degrees | | | | |
|---|---|---|---|---|---|
| TTL/f | 12.425 | TTL/θ | 0.763 | $f_s/f$ | 6.314 |

By the above arrangements of the lenses and stop ST1, the wide-angle lens assembly 1 of the first embodiment can meet the requirements of optical performance as seen in FIGS. 2A-2F.

Figure 2A:
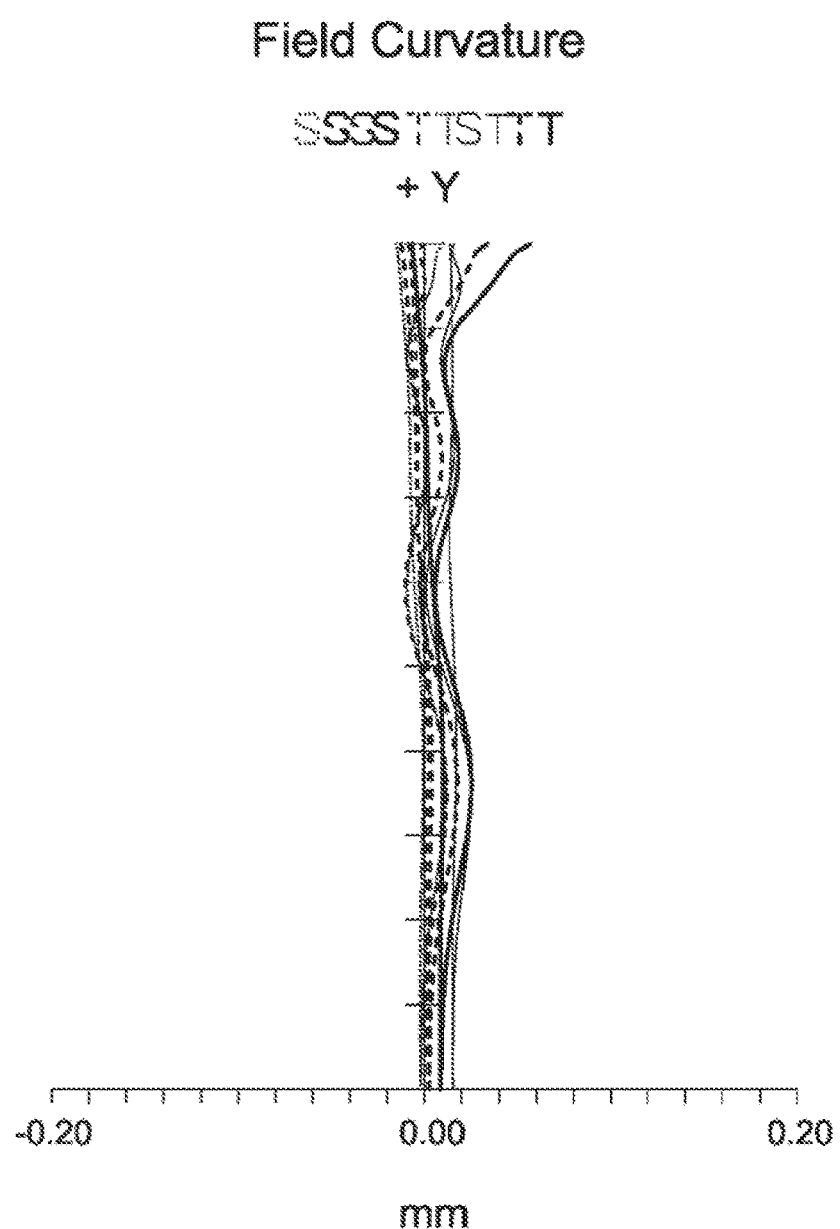
FIG. 2A depicts a field curvature diagram of the wide-angle lens assembly in accordance with the first embodiment of the invention.
Figure 2B:
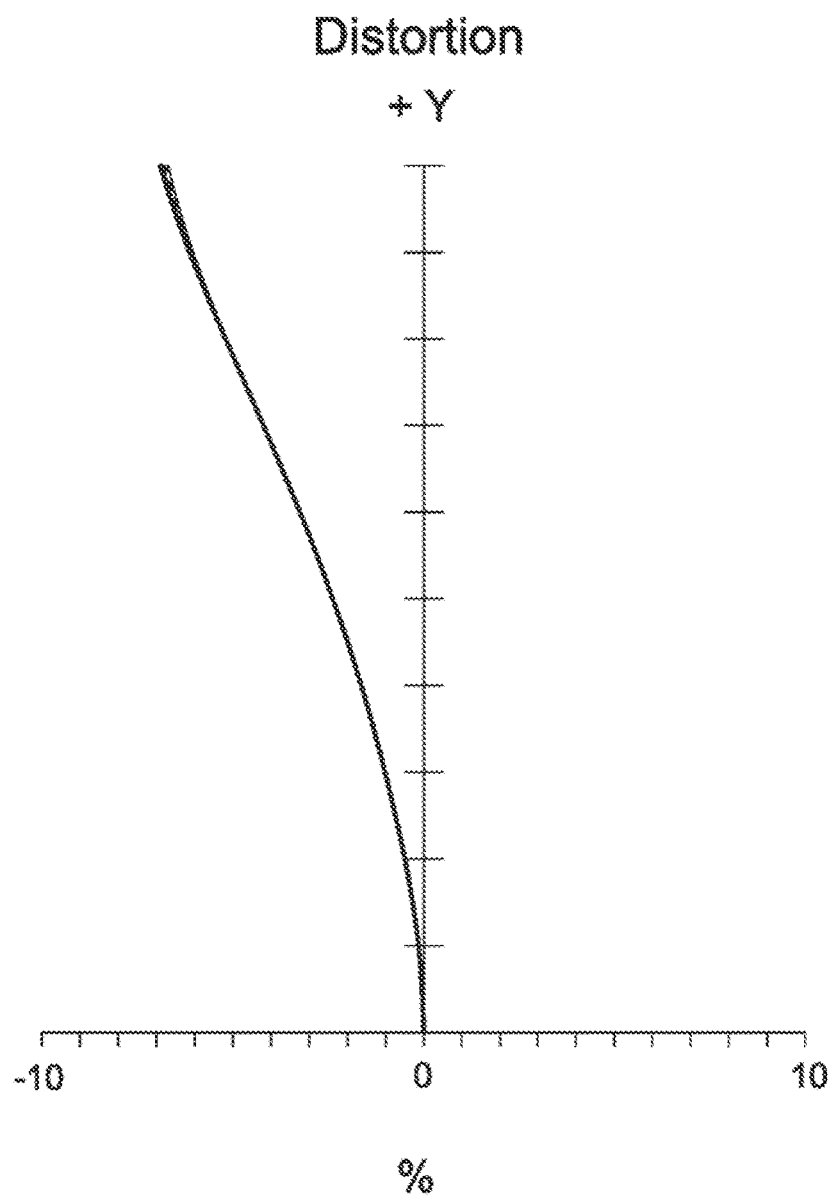
FIG. 2B is a distortion diagram of the wide-angle lens assembly in accordance with the first embodiment of the invention.
Figure 2F:
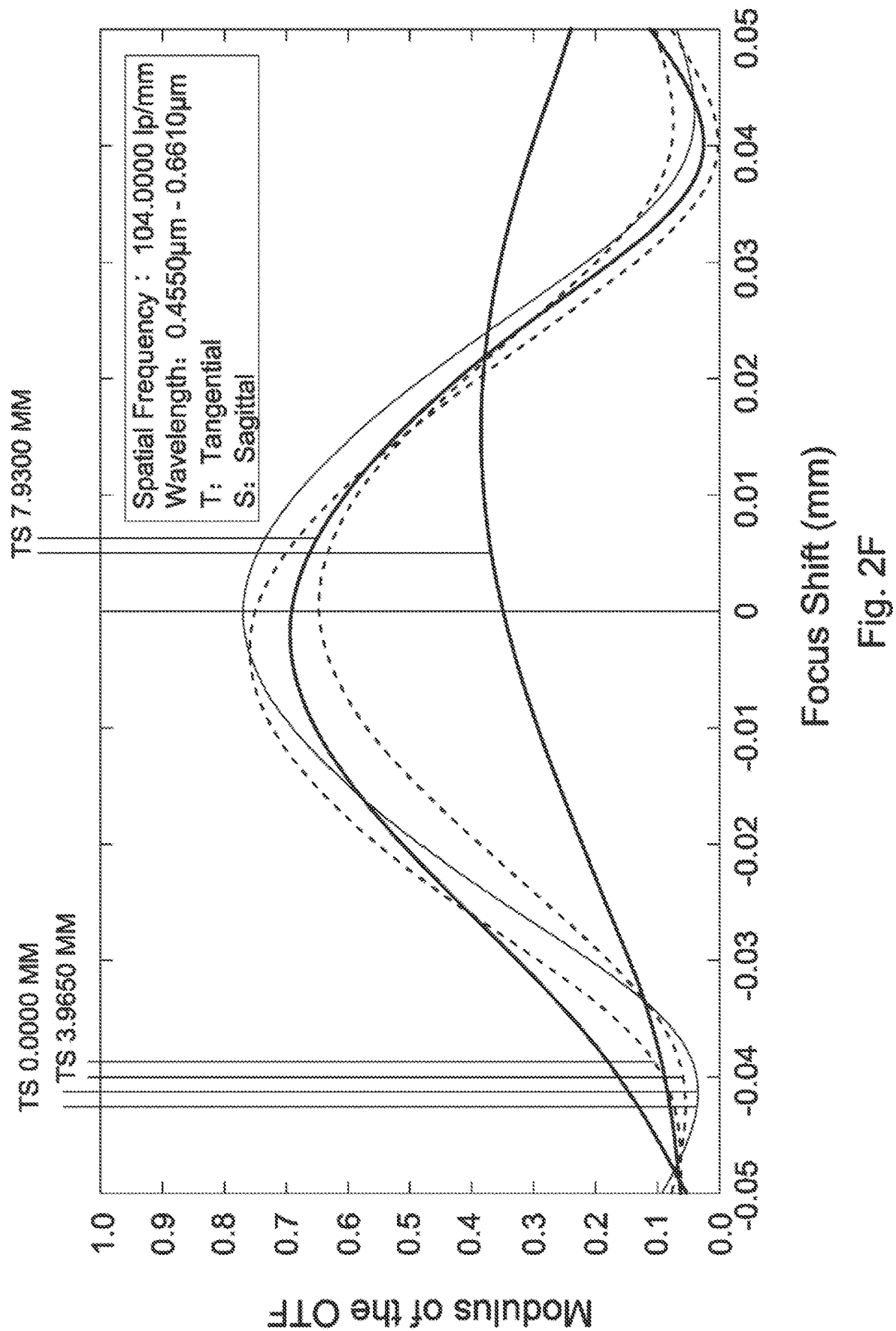
FIG. 2F is a through focus modulation transfer function diagram of the wide-angle lens assembly in accordance with the first embodiment of the invention.

It can be seen from FIG. 2A that the field curvature of tangential direction and sagittal direction in the wide-angle lens assembly 1 of the first embodiment ranges from −0.02 mm to 0.06 mm. It can be seen from FIG. 2B that the distortion in the wide-angle lens assembly 1 of the first embodiment ranges from −7% to 0%. It can be seen from FIGS. 2C-2E that the root mean square spot radius is equal to 0.861 μm and geometrical spot radius is equal to 1.892 μm as image height is equal to 0.000 mm, the root mean square spot radius is equal to 1.460 μm and geometrical spot radius is equal to 4.518 μm as image height is equal to 3.965 mm, and the root mean square spot radius is equal to 6.095 μm and geometrical spot radius is equal to 22.194 μm as image height is equal to 7.930 mm for the lens assembly 1 of the first embodiment. It can be seen from FIG. 2F that the through focus modulation transfer function of tangential direction and sagittal direction in the lens assembly 1 of the first embodiment ranges from 0.0 to 0.78 as focus shift ranges from −0.05 mm to 0.05 mm.

It is obvious that the field curvature and the distortion of the wide-angle lens assembly 1 of the first embodiment can be corrected effectively, and the resolution and the depth of focus of the wide-angle lens assembly 1 of the first embodiment can meet the requirement. Therefore, the wide-angle lens assembly 1 of the first embodiment is capable of good optical performance.

Referring to FIG. 3, FIG. 3 is a lens layout and optical path diagram of a wide-angle lens assembly in accordance with a second embodiment of the invention. the wide-angle lens assembly 2 includes a first lens L21, a second lens L22, a third lens L23, a fourth lens L24, a fifth lens L25, a stop ST2, a sixth lens L26, a seventh lens L27, an eighth lens L28, a ninth lens L29, a tenth lens L210, an optical filter OF2, and a cover glass CG2, all of which are arranged in order from an object side to an image side along an optical axis OA2. In operation, an image of light rays from the object side is formed at an image plane IMA2.

According to, subject matter previously described herein, wherein: the ninth lens L29 is a meniscus lens, wherein the image side surface S217 is a convex surface and the object side surface S216 and the image side surface S217 are spherical surfaces; both of the object side surface S220 and image side surface S221 of the optical filter OF2 are plane surfaces; and both of the object side surface S222 and image side surface S223 of the cover glass CG2 are plane surfaces.

With the above design of the lenses and stop ST2 and at least any one of the conditions (1)-(6) satisfied, the wide-angle lens assembly 2 can have an effective increased field of view, an effective increased resolution, an effective resisted environmental temperature change, an effective corrected aberration, and is capable of an effective corrected chromatic aberration.

Table 4 shows the optical specification of the wide-angle lens assembly 2 in FIG. 3.

TABLE 4

Effective Focal Length = 5.49 mm  F-number = 2.8
Total Lens Length = 66.07 mm  Field of View = 178 degrees
Effective Focal Length of A Combination of The Third Lens and The Fourth Lens = −229.24 mm
Effective Focal Length of A Combination of The Eighth Lens and The Ninth Lens = −165.49 mm

| Surface Number | Radius of Curvature (mm) | Thickness (mm) | Nd | Vd | Effective Focal Length (mm) | Remark |
|---|---|---|---|---|---|---|
| S21 | 47.79 | 2.67 | 1.497 | 81.6084 | −29.79 | The First Lens L21 |
| S22 | 11.11 | 7.38 | | | | |
| S23 | 38.88 | 1.50 | 1.5168 | 64.1673 | −18.58 | The Second Lens L22 |
| S24 | 7.58 | 6.31 | | | | |
| S25 | −10.62 | 3.88 | 1.8467 | 23.7848 | −16.58 | The Third Lens L23 |
| S26 | −49.92 | 3.08 | 1.8042 | 46.5025 | 23.35 | The Fourth Lens L24 |
| S27 | −14.06 | 0.15 | | | | |
| S28 | 80.84 | 5.83 | 1.8467 | 23.7848 | 37.95 | The Fifth Lens L25 |
| S29 | −52.13 | 3.18 | | | | |
| S210 | ∞ | 2.04 | | | | Stop ST2 |
| S211 | 17.14 | 1.72 | 1.497 | 81.6084 | 28.25 | The Sixth Lens L26 |
| S212 | −75.90 | 1.68 | | | | |
| S213 | −23.33 | 7.17 | 1.497 | 81.6084 | 62.52 | The Seventh Lens L27 |
| S214 | −14.70 | 0.15 | | | | |
| S215 | 20.89 | 4.80 | 1.497 | 81.6084 | 15.07 | The Eighth Lens L28 |
| S216 | −10.82 | 1.19 | 1.8467 | 23.7848 | −12.76 | The Ninth Lens L29 |
| S217 | −2169.95 | 3.29 | | | | |
| S218 | 11.83 | 4.54 | 1.5168 | 64.1673 | 30.25 | The Tenth Lens L210 |
| S219 | 42.76 | 2.60 | | | | |
| S220 | ∞ | 0.84 | 1.5168 | 64.1673 | | Optical Filter OF2 |
| S221 | ∞ | 0.30 | | | | |
| S222 | ∞ | 0.50 | 1.5168 | 64.1673 | | Cover Glass CG2 |
| S223 | ∞ | 1.26 | | | | |

The definition of aspheric surface sag z of each aspheric lens in table 4 is the same as that of in Table 1, and is not described here again.

In the second embodiment, the conic constant k and the aspheric coefficients A, B, C, D, E, F, G of each aspheric surface are shown in Table 5.

TABLE 5

| Surface Number | k | A E | B F | C G | D |
|---|---|---|---|---|---|
| S218 | 0.64063 | −0.00025533841 −1.0706626e−011 | 4.7168952e−006 0 | −1.6906538e−007 0 | 2.1543293e−009 |
| S219 | 25.08218 | −0.00038550801 −1.751061e−010 | 1.3490884e−005 1.6330922e−012 | −5.1745427e−007 −6.9227179e−015 | 1.1831998e−008 |

Table 6 shows the parameters and condition values for conditions (1)-(6) in accordance with the second embodiment of the invention. It can be seen from Table 6 that the wide-angle lens assembly 2 of the second embodiment satisfies the conditions (1)-(6).

TABLE 6

| θ | 89 degrees | | | | |
|---|---|---|---|---|---|
| TTL/f | 12.034 | TTL/θ | 0.742 | $f_5/f$ | 6.913 |

By the above arrangements of the lenses and stop ST2, the wide-angle lens assembly 2 of the second embodiment can meet the requirements of optical performance as seen in FIGS. 4A-4F.

Figure 4A:
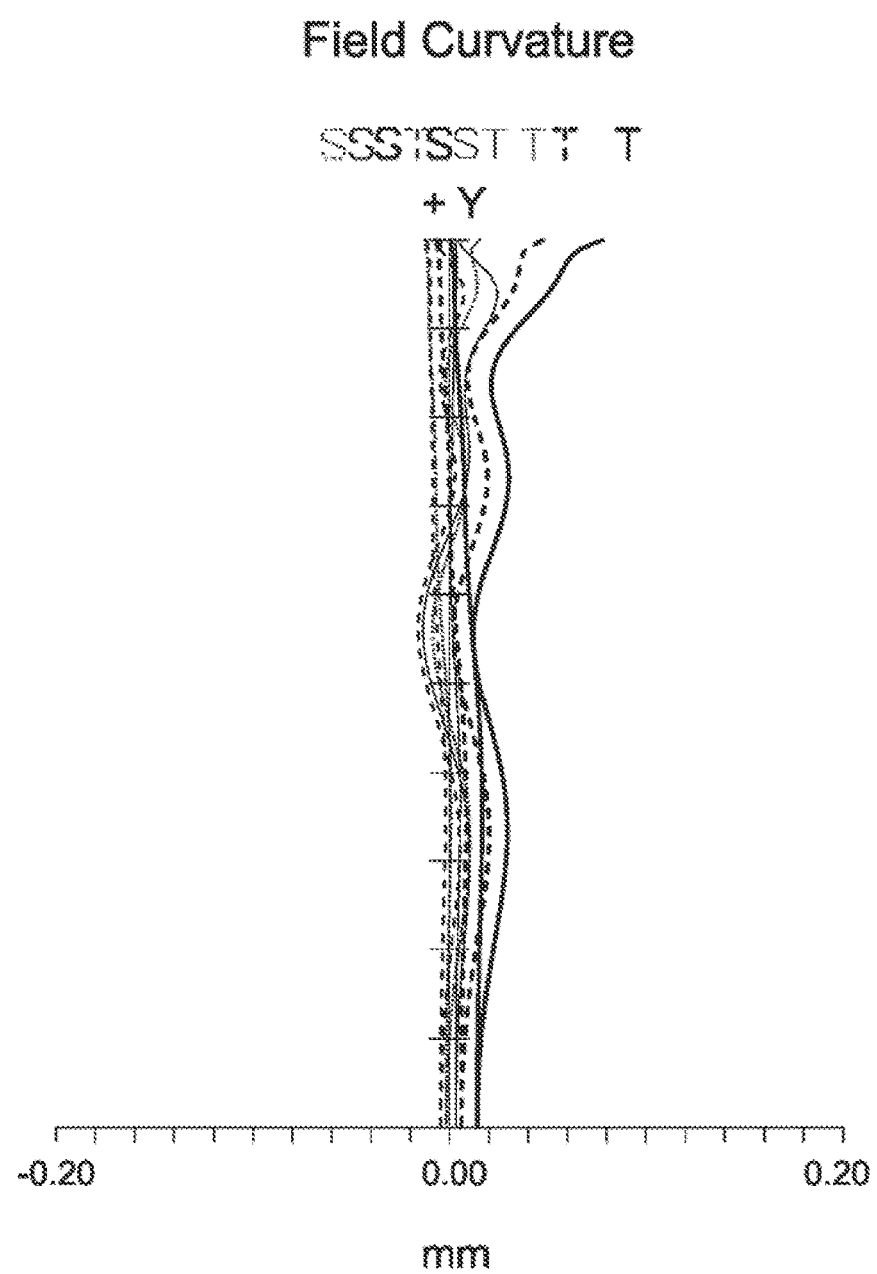
FIG. 4A depicts a field curvature diagram of the wide-angle lens assembly in accordance with the second embodiment of the invention.
Figure 4B:
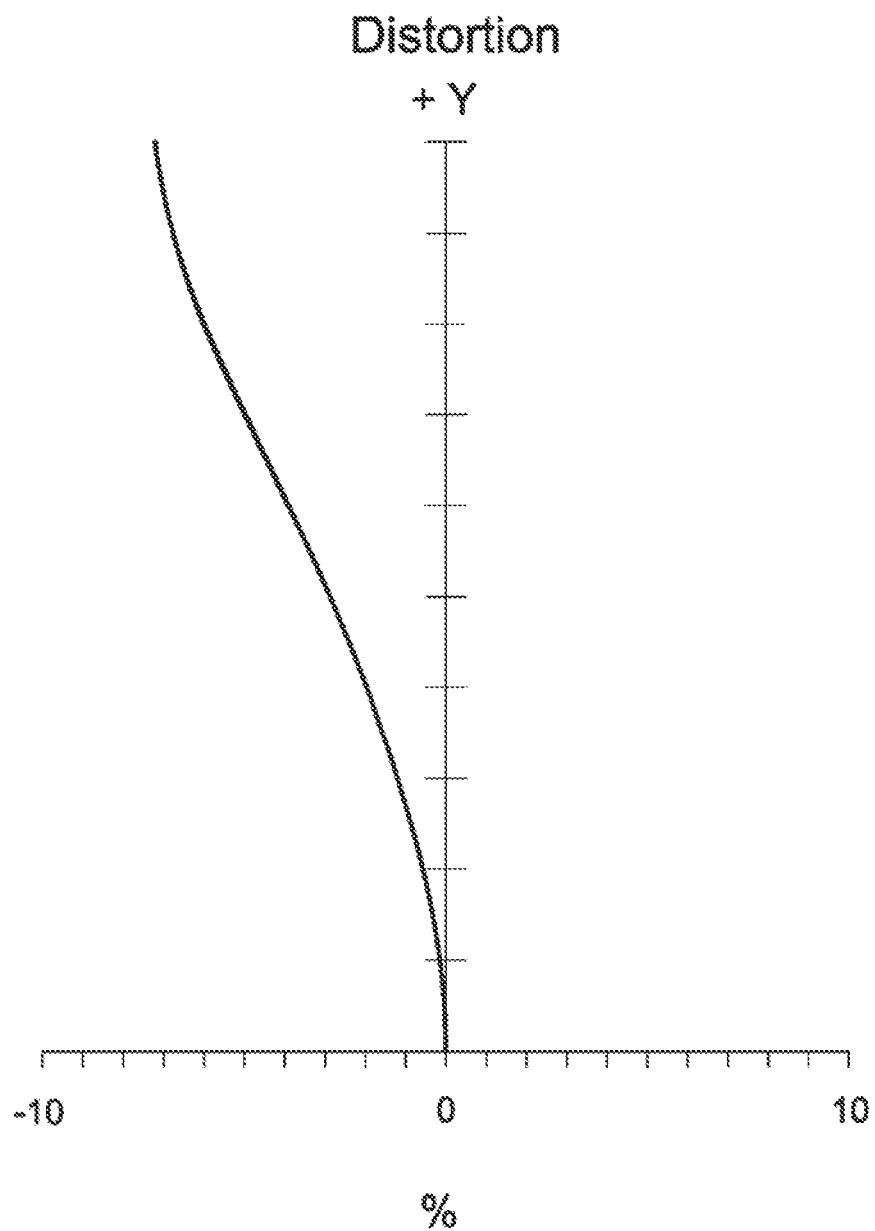
FIG. 4B is a distortion diagram of the wide-angle lens assembly in accordance with the second embodiment of the invention.
Figure 4C:
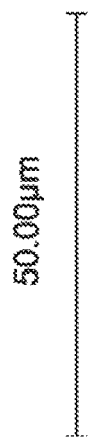
FIGS. 4C-4E are spot diagrams of the wide-angle lens assembly in accordance with the second embodiment of the invention.
Figure 4C:
Figure 4D:
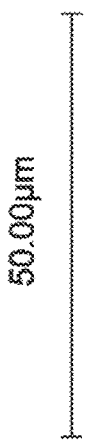
Figure 4D:
Figure 4E:
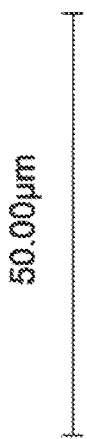
Figure 4E:
Figure 4F:
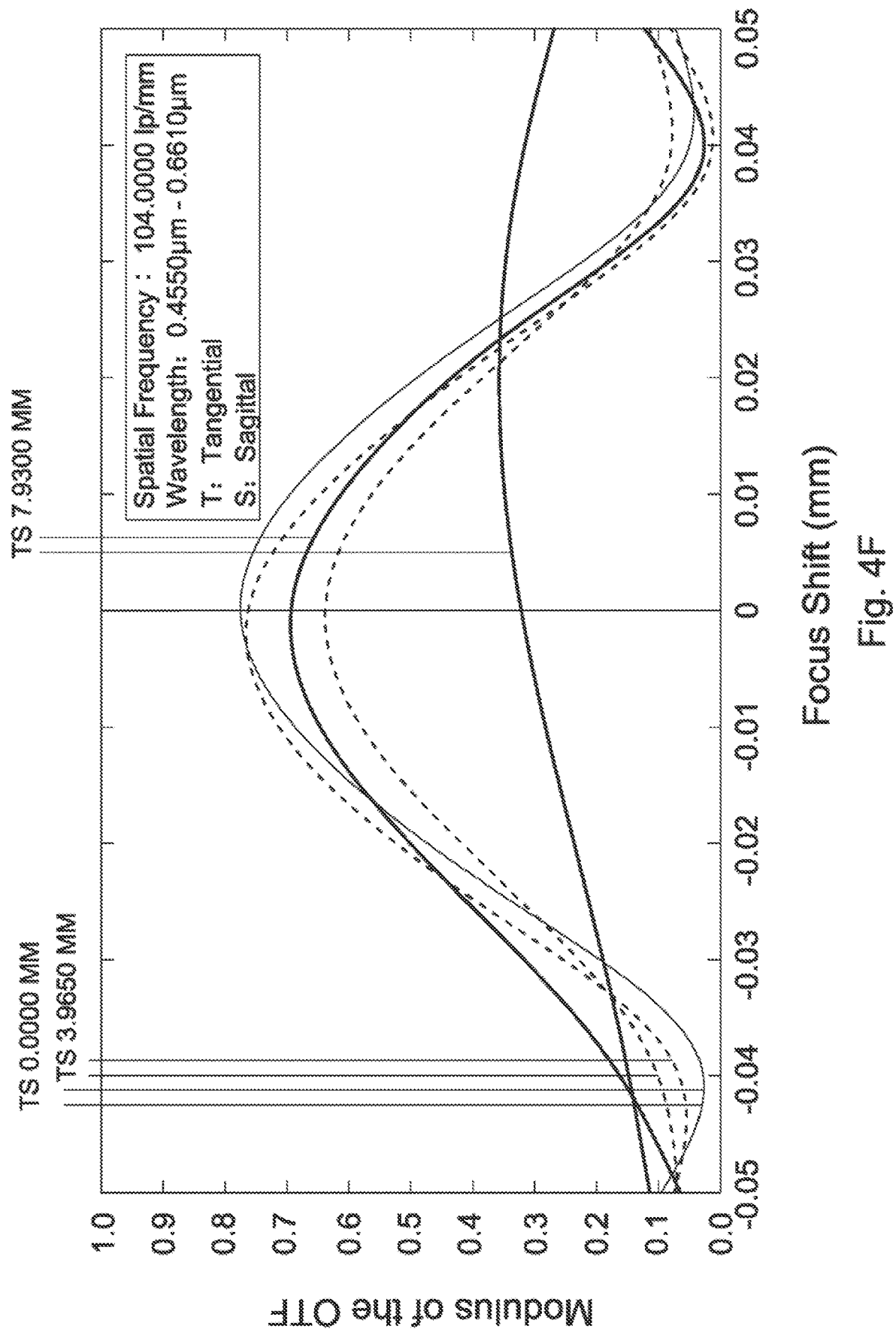
FIG. 4F is a through focus modulation transfer function diagram of the wide-angle lens assembly in accordance with the second embodiment of the invention.

It can be seen from FIG. 4A that the field curvature of tangential direction and sagittal direction in the wide-angle lens assembly 2 of the second embodiment ranges from −0.02 mm to 0.08 mm. It can be seen from FIG. 4B that the distortion in the wide-angle lens assembly 2 of the second embodiment ranges from −7% to 0%. It can be seen from FIGS. 4C-4E that the root mean square spot radius is equal to 0.747 μm and geometrical spot radius is equal to 1.592 μm as image height is equal to 0.000 mm, the root mean square spot radius is equal to 1.414 μm and geometrical spot radius is equal to 3.569 μm as image height is equal to 3.965 mm, and the root mean square spot radius is equal to 3.428 μm and geometrical spot radius is equal to 13.198 μm as image height is equal to 7.930 mm for the lens assembly 2 of the second embodiment. It can be seen from FIG. 4F that the through focus modulation transfer function of tangential direction and sagittal direction in the lens assembly 2 of the second embodiment ranges from 0.0 to 0.78 as focus shift ranges from −0.05 mm to 0.05 mm.

It is obvious that the field curvature and the distortion of the wide-angle lens assembly 2 of the second embodiment can be corrected effectively, and the resolution and the depth of focus of the wide-angle lens assembly 2 of the second embodiment can meet the requirement. Therefore, the wide-angle lens assembly 2 of the second embodiment is capable of good optical performance.

Referring to FIG. 5, FIG. 5 is a lens layout and optical path diagram of a wide-angle lens assembly in accordance with a third embodiment of the invention. the wide-angle lens assembly 3 includes a first lens L31, a second lens L32, a third lens L33, a fourth lens L34, a fifth lens L35, a stop ST3, a sixth lens L36, a seventh lens L37, an eighth lens L38, a ninth lens L39, a tenth lens L310, an optical filter OF3, and a cover glass CG3, all of which are arranged in order from an object side to an image side along an optical axis OA3. In operation, an image of light rays from the object side is formed at an image plane IMA3.

According, subject matter previously described herein, wherein: the ninth lens L39 is a plane-concave lens, wherein the image side surface S317 is a plane surface; both of the object side surface S320 and image side surface S321 of the optical filter OF3 are plane surfaces; and both of the object side surface S322 and image side surface S323 of the cover glass CG3 are plane surfaces.

With the above design of the lenses and stop ST3 and at least any one of the conditions (1)-(6) satisfied, the wide-angle lens assembly 3 can have an effective increased field of view, an effective increased resolution, an effective resisted environmental temperature change, an effective corrected aberration, and is capable of an effective corrected chromatic aberration.

Table 7 shows the optical specification of the wide-angle lens assembly 3 in FIG. 5.

TABLE 7

| Effective Focal Length = 5.41 mm | | | F-number = 2.8 | | | |
|---|---|---|---|---|---|---|
| Total Lens Length = 69.98 mm | | | Field of View = 178.1 degrees | | | |
| Effective Focal Length of A Combination of The Third Lens and The Fourth Lens = −255.38 mm | | | | | | |
| Effective Focal Length of A Combination of The Eighth Lens and The Ninth Lens = −124.71 mm | | | | | | |
| Surface Number | Radius of Curvature (mm) | Thickness (mm) | Nd | Vd | Effective Focal Length (mm) | Remark |
|---|---|---|---|---|---|---|
| S31 | 41.90 | 2.91 | 1.5935 | 67.3266 | −30.62 | The First Lens L31 |
| S32 | 12.37 | 7.99 | | | | |
| S33 | 58.38 | 1.72 | 1.5168 | 64.2124 | −19.87 | The Second Lens L32 |
| S34 | 8.66 | 7.42 | | | | |
| S35 | −11.71 | 6.92 | 1.8467 | 23.7848 | −18.03 | The Third Lens L33 |
| S36 | −62.59 | 2.85 | 1.8042 | 46.5025 | 26.91 | The Fourth Lens L34 |
| S37 | −16.45 | 0.20 | | | | |
| S38 | 52.25 | 2.02 | 1.8467 | 23.7848 | 43.16 | The Fifth Lens L35 |
| S39 | −122.08 | 6.63 | | | | |
| S310 | ∞ | 0.29 | | | | Stop ST3 |
| S311 | 16.48 | 1.86 | 1.4875 | 70.4196 | 28.01 | The Sixth Lens L36 |
| S312 | −77.74 | 1.49 | | | | |
| S313 | −21.16 | 7.33 | 1.497 | 81.6084 | 70.03 | The Seventh Lens L37 |
| S314 | −14.69 | 0.20 | | | | |
| S315 | 22.76 | 3.84 | 1.497 | 81.6084 | 15.65 | The Eighth Lens L38 |
| S316 | −11.19 | 1.03 | 1.8467 | 23.7848 | −13.13 | The Ninth Lens L39 |
| S317 | ∞ | 5.48 | | | | |
| S318 | 11.54 | 4.30 | 1.5142 | 64.1005 | 28.77 | The Tenth Lens L310 |
| S319 | 45.36 | 2.60 | | | | |
| S320 | ∞ | 0.70 | 1.5168 | 64.1673 | | Optical Filter OF3 |
| S321 | ∞ | 0.30 | | | | |
| S322 | ∞ | 0.50 | 1.5168 | 64.1673 | | Cover Glass CG3 |
| S323 | ∞ | 1.41 | | | | |

The definition of aspheric surface sag z of each aspheric lens in table 7 is the same as that of in Table 1, and is not described here again.

In the third embodiment, the conic constant k and the aspheric coefficients A, B, C, D, E, F, G of each aspheric surface are shown in Table 8.

TABLE 8

| Surface Number | k | A E | B F | C G | D |
|---|---|---|---|---|---|
| S318 | 0.372693 | −0.0001845831 −9.5514934e−012 | 4.1484162e−006 0 | −1.3600336e−007 0 | 1.722083e−009 |
| S319 | 25.26336 | −0.0002430391 −1.622046e−010 | 1.1625706e−005 1.4491859e−012 | −4.6073021e−007 −5.8755947e−015 | 1.0781008e−008 |

Table 9 shows the parameters and condition values for conditions (1)-(6) in accordance with the third embodiment of the invention. It can be seen from Table 9 that the wide-angle lens assembly 3 of the third embodiment satisfies the conditions (1)-(6).

TABLE 9

| θ | 89.05 degrees | | | | |
|---|---|---|---|---|---|
| TTL/f | 12.935 | TTL/θ | 0.786 | $f_5/f$ | 7.978 |

By the above arrangements of the lenses and stop ST3, the wide-angle lens assembly 3 of the third embodiment can meet the requirements of optical performance as seen in FIGS. 6A-6F.

Figure 6A:
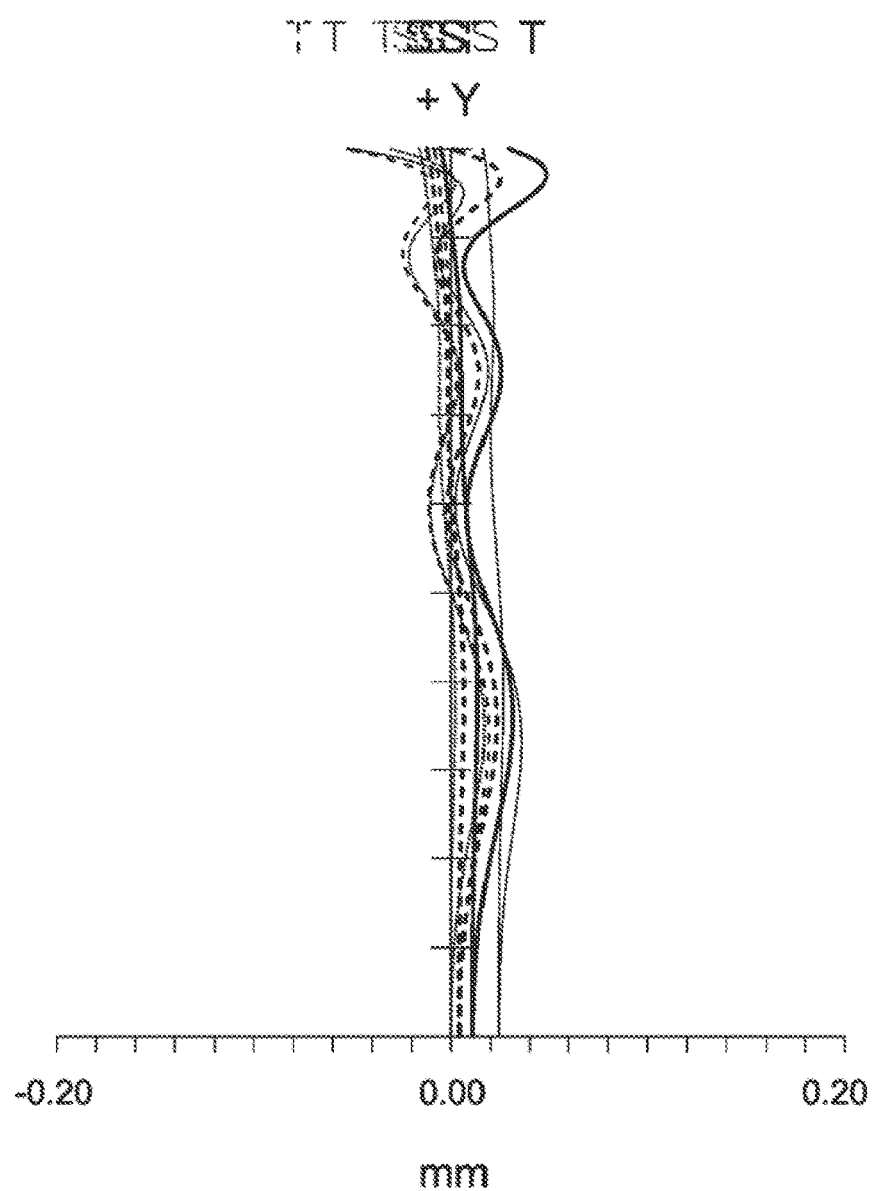
FIG. 6A depicts a field curvature diagram of the wide-angle lens assembly in accordance with the third embodiment of the invention.
Figure 6B:
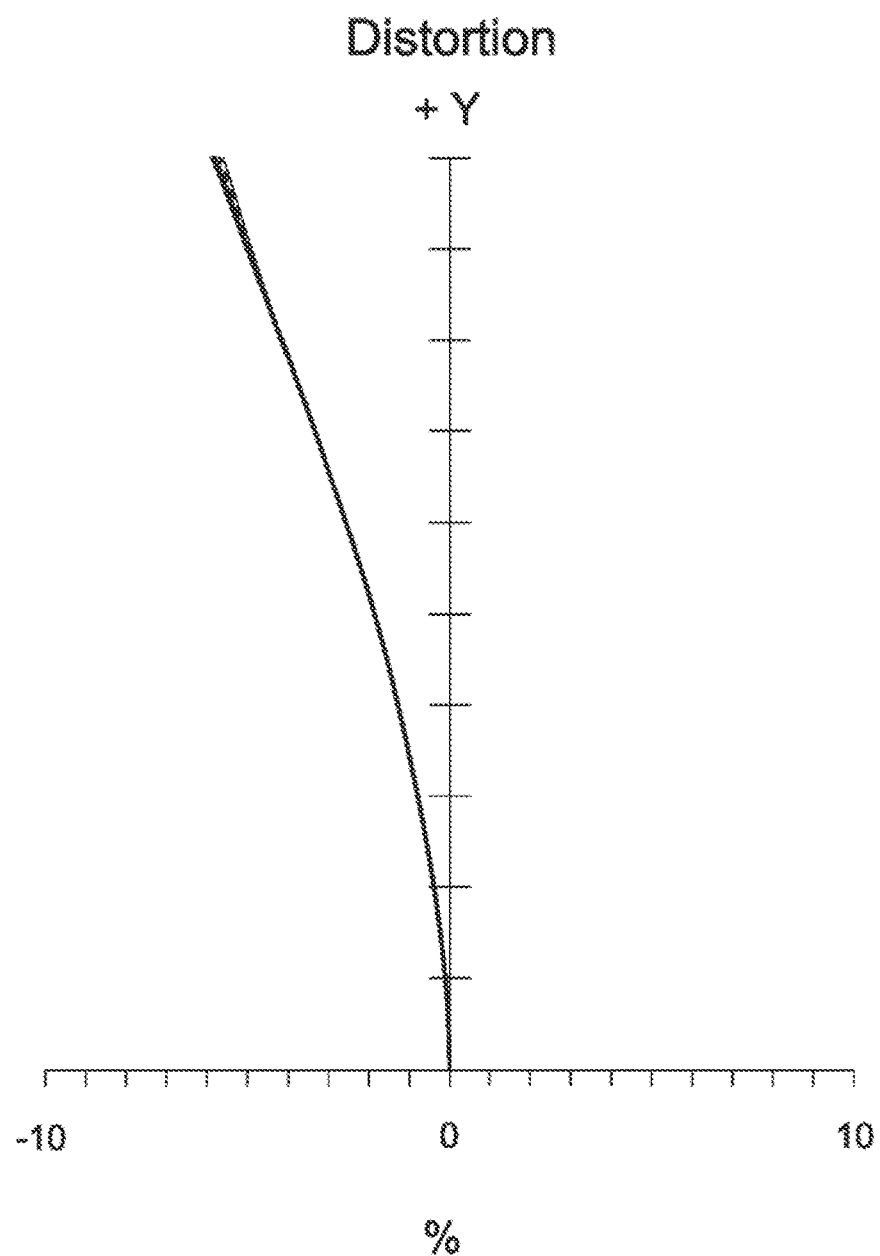
FIG. 6B is a distortion diagram of the wide-angle lens assembly in accordance with the third embodiment of the invention.
Figure 6C:
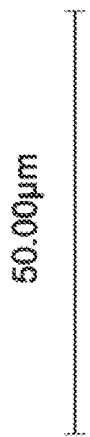
FIGS. 6C-6E are spot diagrams of the wide-angle lens assembly in accordance with the third embodiment of the invention.
Figure 6C:
Figure 6D:
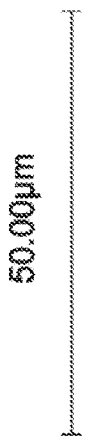
Figure 6D:
Figure 6E:
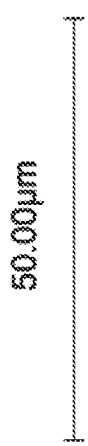
Figure 6E:
Figure 6F:
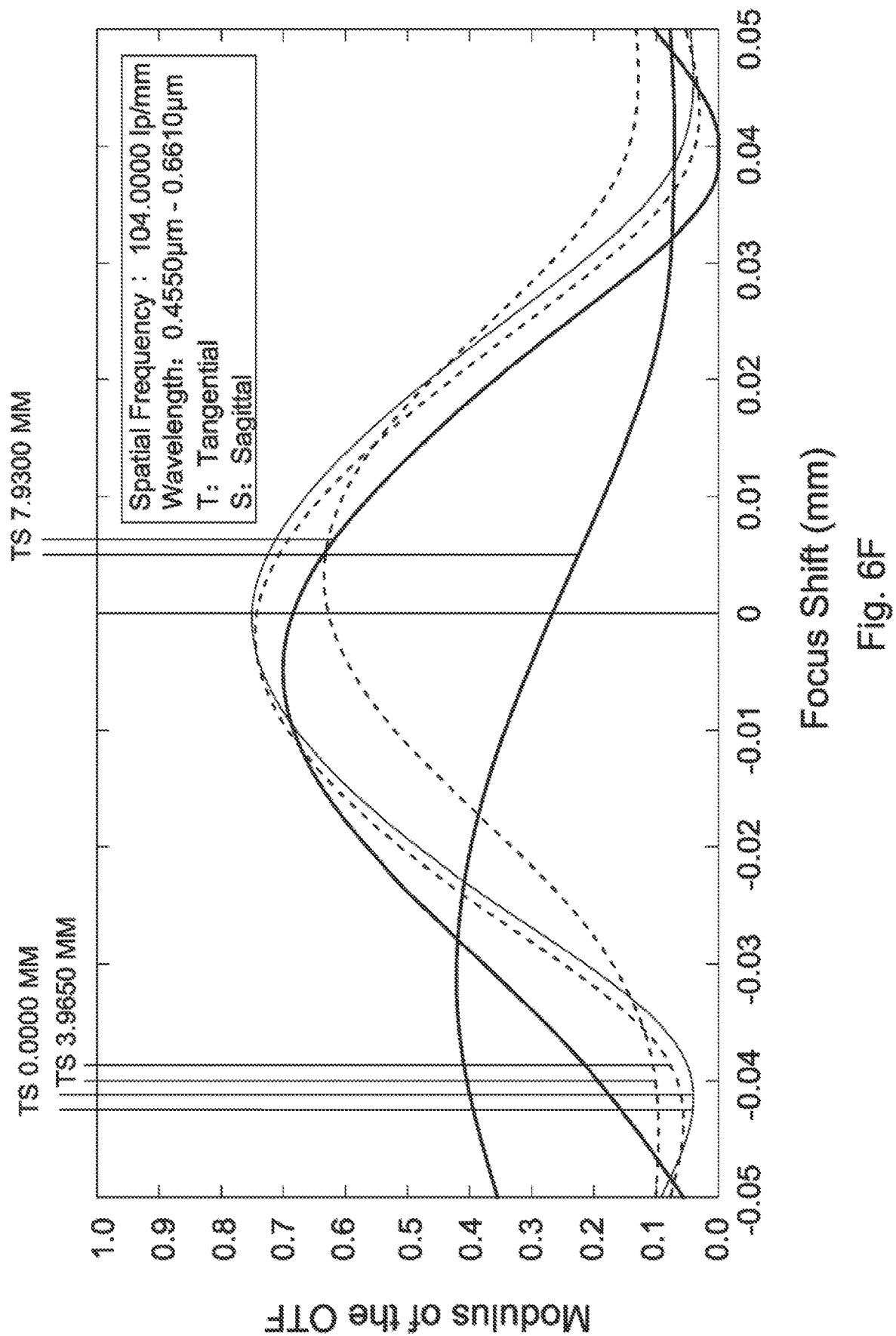
FIG. 6F is a through focus modulation transfer function diagram of the wide-angle lens assembly in accordance with the third embodiment of the invention.

It can be seen from FIG. 6A that the field curvature of tangential direction and sagittal direction in the wide-angle lens assembly 3 of the third embodiment ranges from −0.05 mm to 0.05 mm. It can be seen from FIG. 6B that the distortion in the wide-angle lens assembly 3 of the third embodiment ranges from −6% to 0%. It can be seen from FIGS. 6C-6E that the root mean square spot radius is equal to 1.144 μm and geometrical spot radius is equal to 2.570 μm as image height is equal to 0.000 mm, the root mean square spot radius is equal to 1.396 μm and geometrical spot radius is equal to 3.661 μm as image height is equal to 3.965 mm, and the root mean square spot radius is equal to 5.516 μm and geometrical spot radius is equal to 19.388 μm as image height is equal to 7.930 mm for the lens assembly 3 of the third embodiment. It can be seen from FIG. 6F that the through focus modulation transfer function of tangential direction and sagittal direction in the lens assembly 3 of the third embodiment ranges from 0.0 to 0.75 as focus shift ranges from −0.05 mm to 0.05 mm.

It is obvious that the field curvature and the distortion of the wide-angle lens assembly 3 of the third embodiment can be corrected effectively, and the resolution and the depth of focus of the wide-angle lens assembly 3 of the third embodiment can meet the requirement. Therefore, the wide-angle lens assembly 3 of the third embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens assembly comprising:
a first lens which is a meniscus lens with negative refractive power;
a second lens which is a meniscus lens with negative refractive power;
a third lens which is with negative refractive power;
a fourth lens which is with refractive power and comprises a concave surface facing an object side;
a fifth lens which is with positive refractive power;
a sixth lens which is with positive refractive power;
a seventh lens which is with refractive power and comprises a concave surface facing the object side;
an eighth lens which is with positive refractive power;
a ninth lens which is with negative refractive power; and
a tenth lens which is with refractive power and comprises a concave surface facing an image side;
wherein the first lens, the second lens, the third lens, the fourth lens, the fifth lens, the sixth lens, the seventh lens, the eighth lens, the ninth lens, and the tenth lens are arranged in order from the object side to the image side along an optical axis;
wherein the wide-angle lens assembly satisfies:

$6<f_5/f<8.5$;

wherein $f_5$ is an effective focal length in mm of the fifth lens and f is an effective focal length in mm of the wide-angle lens assembly.

2. The wide-angle lens assembly as claimed in claim 1, wherein:
the first lens comprises a convex surface facing the object side and a concave surface facing the image side;
the second lens comprises a convex surface facing the object side and a concave surface facing the image side;
the third lens comprises a concave surface facing the object side and a convex surface facing the image side;
the fourth lens is with positive refractive power and further comprises a convex surface facing the image side;
the fifth lens comprises a convex surface facing the object side and another convex surface facing the image side;
the sixth lens comprises a convex surface facing the object side and another convex surface facing the image side;
the seventh lens is with positive refractive power and further comprises a convex surface facing the image side;
the eighth lens comprises a convex surface facing the object side and another convex surface facing the image side;
the ninth lens comprises a concave surface facing the object side and a convex surface facing the image side, or the ninth lens comprises a concave surface facing the object side and a plane surface facing the image side; and
the tenth lens is with positive refractive power and further comprises a convex surface facing the object side.

3. The wide-angle lens assembly as claimed in claim 1, wherein the third lens and the fourth lens are cemented and the eighth lens and the ninth lens are cemented.

4. The wide-angle lens assembly as claimed in claim 1, wherein the wide-angle lens assembly satisfies at least one of the following conditions:

$0.7 < TTL/\theta < 0.82$;

$11 < TTL/f < 14$;

$12.03 < TTL/f < 12.93$;

$0.74 < TTL/\theta < 0.79$;

$6.31 < f_5/f < 7.98$;

wherein TTL is an interval in mm from an object side surface of the first lens to an image plane along the optical axis, θ is a half field of view in degree for the wide-angle lens assembly, $f_5$ is the effective focal length in mm of the fifth lens, and f is the effective focal length in mm of the wide-angle lens assembly.

5. A wide-angle lens assembly comprising:
a first lens which is a meniscus lens with negative refractive power;
a second lens which is a meniscus lens with negative refractive power;
a third lens which is with refractive power;
a fourth lens which is with refractive power;
a fifth lens which is with positive refractive power;
a sixth lens which is with positive refractive power;
a seventh lens which is with refractive power and comprises a concave surface facing an object side;
an eighth lens which is with refractive power;
a ninth lens which is with refractive power; and
a tenth lens which is with refractive power and comprises a concave surface facing an image side;
wherein the first lens, the second lens, the third lens, the fourth lens, the fifth lens, the sixth lens, the seventh lens, the eighth lens, the ninth lens, and the tenth lens are arranged in order from the object side to the image side along an optical axis;
wherein the wide-angle lens assembly satisfies:

$0.7 < TTL/\theta < 0.82$;

wherein TTL is an interval in mm from an object side surface of the first lens to an image plane along the optical axis and θ is a half field of view in degree for the wide-angle lens assembly.

6. The wide-angle lens assembly as claimed in claim 5, wherein:
the third lens is with negative refractive power;
the fourth lens is with positive refractive power and comprises a concave surface facing the object side and a convex surface facing the image side;
the seventh lens is with positive refractive power and further comprises a convex surface facing the image side;
the eighth lens which is with positive refractive power;
the ninth lens which is with negative refractive power; and
the tenth lens is with positive refractive power and further comprises a convex surface facing the object side.

7. The wide-angle lens assembly as claimed in claim 6, wherein:
the first lens comprises a convex surface facing the object side and a concave surface facing the image side;
the second lens comprises a convex surface facing the object side and a concave surface facing the image side;
the third lens comprises a concave surface facing the object side and a convex surface facing the image side;
the fifth lens comprises a convex surface facing the object side and another convex surface facing the image side;
the sixth lens comprises a convex surface facing the object side and another convex surface facing the image side;
the eighth lens comprises a convex surface facing the object side and another convex surface facing the image side; and
the ninth lens comprises a concave surface facing the object side.

8. The wide-angle lens assembly as claimed in claim 6, wherein the ninth lens comprises a convex surface or a plane surface facing the image side.

9. The wide-angle lens assembly as claimed in claim 5, wherein the third lens and the fourth lens are cemented to form a lens with negative refractive power.

10. The wide-angle lens assembly as claimed in claim 5, wherein the eighth lens and the ninth lens are cemented to form a lens with negative refractive power.

11. The wide-angle lens assembly as claimed in claim 5, wherein the wide-angle lens assembly satisfies at least one of the following conditions:

$11 < TTL/f < 14$, $6 < f_5/f < 8.5$;

wherein TTL is the interval in mm from the object side surface of the first lens to the image plane along the optical axis, $f_5$ is an effective focal length in mm of the fifth lens, and f is an effective focal length in mm of the wide-angle lens assembly.

12. The wide-angle lens assembly as claimed in claim 11, wherein the wide-angle lens assembly satisfies at least one of the following conditions:

$12.03 < TTL/f < 12.93$;

$0.74 < TTL/\theta < 0.79$;

$6.31 < f_5/f < 7.98$;

wherein TTL is the interval in mm from the object side surface of the first lens to the image plane along the optical axis, θ is the half field of view in degree for the wide-angle lens assembly, $f_5$ is the effective focal length in mm of the fifth lens, and f is the effective focal length in mm of the wide-angle lens assembly.

13. A wide-angle lens assembly comprising:
a first lens which is a meniscus lens with negative refractive power;
a second lens which is a meniscus lens with negative refractive power;
a third lens which is with refractive power;
a fourth lens which is with refractive power;
a fifth lens which is with positive refractive power;
a sixth lens which is with positive refractive power;
a seventh lens which is with refractive power and comprises a concave surface facing an object side;
an eighth lens which is with refractive power;
a ninth lens which is with refractive power; and
a tenth lens which is with refractive power and comprises a concave surface facing an image side;
wherein the first lens, the second lens, the third lens, the fourth lens, the fifth lens, the sixth lens, the seventh lens, the eighth lens, the ninth lens, and the tenth lens are arranged in order from the object side to the image side along an optical axis;

wherein the third lens and the fourth lens are cemented and the eighth lens and the ninth lens are cemented;

wherein the wide-angle lens assembly satisfies:

$11<TTL/f<14;$ wherein TTL is an interval in mm from an object side surface of the first lens to an image plane along the optical axis and f is an effective focal length in mm of the wide-angle lens assembly.

14. The wide-angle lens assembly as claimed in claim 13, wherein:
the fourth lens is with positive refractive power and comprises a convex surface facing the image side;
the seventh lens is with positive refractive power and further comprises a convex surface facing the image side; and
the tenth lens is with positive refractive power and further comprises a convex surface facing the object side.

15. The wide-angle lens assembly as claimed in claim 14, wherein:
the first lens comprises a convex surface facing the object side and a concave surface facing the image side;
the second lens comprises a convex surface facing the object side and a concave surface facing the image side;
the third lens comprises a concave surface facing the object side and a convex surface facing the image side;
the fifth lens comprises a convex surface facing the object side and another convex surface facing the image side;
the sixth lens comprises a convex surface facing the object side and another convex surface facing the image side;
the eighth lens comprises a convex surface facing the object side and another convex surface facing the image side; and
the ninth lens comprises a concave surface facing the object side.

16. The wide-angle lens assembly as claimed in claim 14, wherein the ninth lens comprises a convex surface or a plane surface facing the image side.

17. The wide-angle lens assembly as claimed in claim 13, wherein:
the third lens is with negative refractive power;
the fourth lens comprises a concave surface facing the object side;
the eighth lens which is with positive refractive power; and
the ninth lens which is with negative refractive power.

18. The wide-angle lens assembly as claimed in claim 13, wherein the wide-angle lens assembly satisfies at least one of the following conditions:

$6<f_5/f<8.5;$ $0.7<TTL/\theta<0.82;$ wherein TTL is the interval in mm from the object side surface of the first lens to the image plane along the optical axis, $\theta$ is a half field of view in degree for the wide-angle lens assembly, $f_5$ is an effective focal length in mm of the fifth lens, and f is the effective focal length in mm of the wide-angle lens assembly.

* * * * *